Nov. 26, 1963  R. WILDBOLZ ETAL  3,112,139
AUTOMATIC CARDING PLANT
Filed July 31, 1961  2 Sheets-Sheet 1
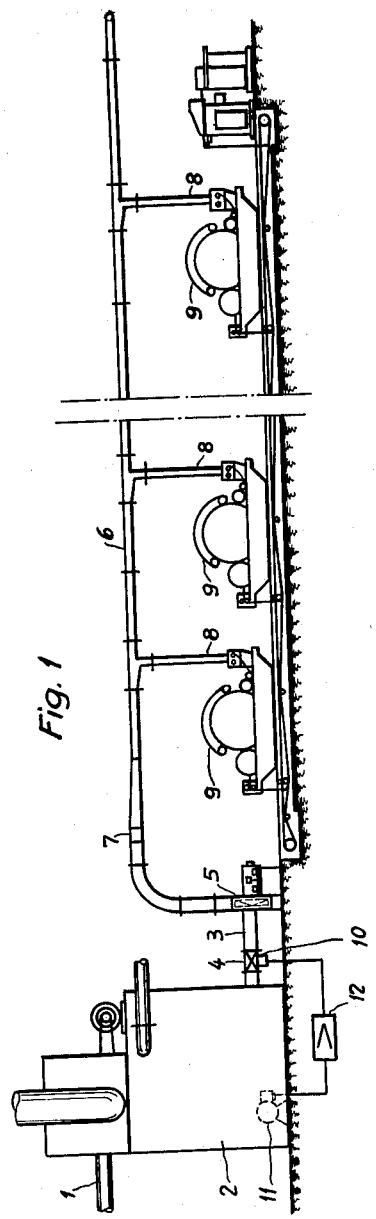
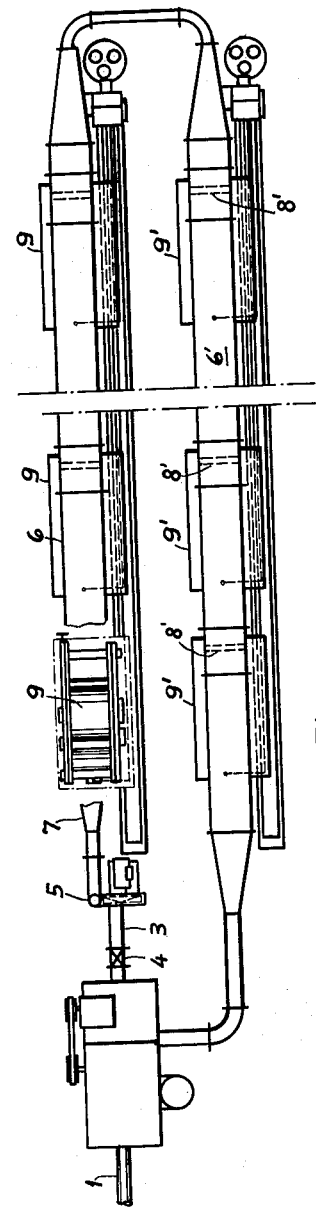
INVENTORS
RUDOLF WILDBOLZ
ROLF BINDER
PAUL STÄHELI
BY K.B.Mayr
ATTORNEY Nov. 26, 1963    R. WILDBOLZ ETAL    3,112,139
AUTOMATIC CARDING PLANT Filed July 31, 1961    2 Sheets-Sheet 2

INVENTORS
RUDOLF WILDBOLZ
ROLF BINDER
PAUL STÄHELI

BY K. B. Mayr

ATTORNEY

United States Patent Office
3,112,139
Patented Nov. 26, 1963

3,112,139
AUTOMATIC CARDING PLANT
Rudolf Wildbolz and Rolf Binder, Winterthur, and Paul Stäheli, Wallisellen, Switzerland, assignors to Rieter Machine Works Ltd., Winterthur, Switzerland, a corporation of Switzerland
Filed July 31, 1961, Ser. No. 128,089
Claims priority, application Switzerland Dec. 22, 1960
5 Claims. (Cl. 302—22)

The present invention relates to an automatic carding plant of a spinning mill and more particularly to a cotton feeder for a pneumatic cotton conveyor corresponding to that disclosed in our copending application Serial No. 840,395, filed September 16, 1959, of which the present application is a continuation-in-part and which matured into Patent No. 3,029,477.

The essential feature of the automatic carding plant disclosed in the parent application is a duct connected to a cotton supply unit and pneumatically conducting the cotton under superatmospheric pressure into a plurality of shafts which are connected in parallel relation to the duct with respect to the flow of the transporting air or gas. The duct forms a loop and has an outlet end connected to the cotton supply or feeding unit for returning the air and cotton thereto which are not received in the shafts. In the system disclosed in the parent application the feeding unit comprises a suction box connected to a source of cotton supply and discharging cotton into a feeding box wherefrom the cotton enters a beater.

The aforedescribed system has the disadvantage that the returned surplus cotton is passed once more through a beater. Cotton agglomerations which may develop in the conveyor duct are of a very loose nature and passage thereof once more through a beater is not only superfluous and wasteful, but may also be harmful.

It is an object of the present invention to provide an automatic carding system of the aforedescribed type but avoiding a second beating of the cotton. To achieve this object the feeding unit is provided with a surplus cotton receiving return shaft wherefrom the returned cotton may be directly returned to the distributing or conveying duct without passing through a nip and a beating apparatus which form part of the feeding unit but receive only the cotton which is initially fed into the system.

A further object of the present invention is the provision of an automatic control of the feeding unit of a cotton transporting and distributing system as described above wherein the rate of flow of fresh cotton into the system is controlled in response to the rate of flow of cotton through the inlet of the circulating duct. Since not only beaten fresh cotton but also surplus cotton returned by the circulating duct enters the inlet of the circulating duct, less fresh cotton is fed into the system upon an increase of unused returned cotton and conversely.

The novel features which are considered characteristic of the invention are set forth with particularity in the appended claims. The invention itself, however, and additional objects and advantages thereof will best be understood from the following description of embodiments thereof when read in connection with the accompanying drawing wherein:

FIG. 1 is a diagrammatic elevation of an automatic carding plant according to the invention.

FIG. 2 is a diagrammatic plan view of the carding plant shown in FIG. 1.

Figures 3, 4:
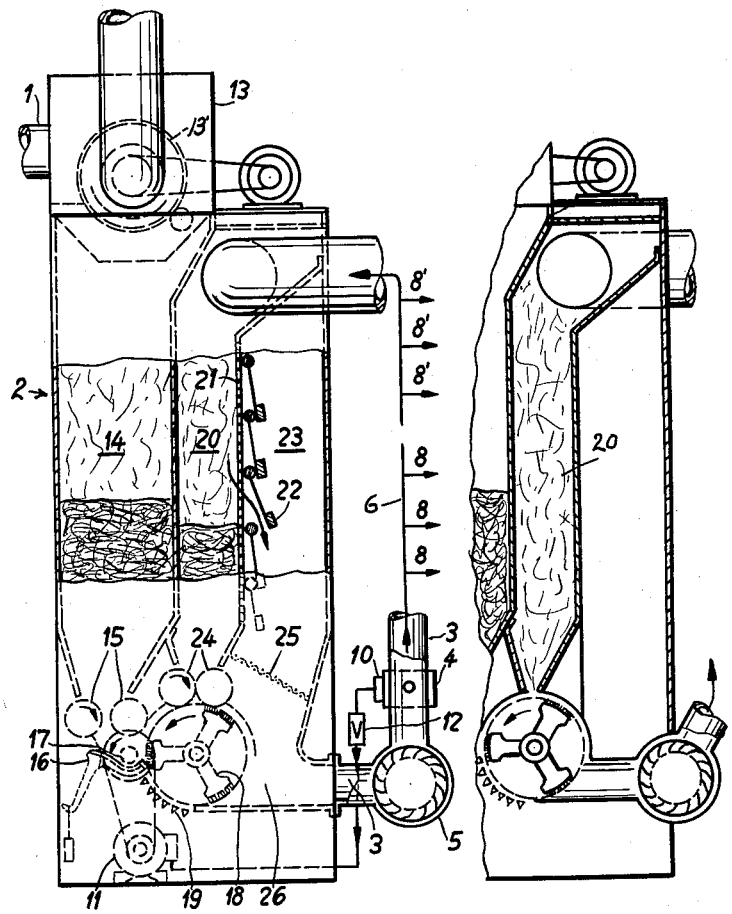
FIG. 3 is a part sectional diagrammatic elevation of a cotton feeder unit forming part of the plant shown in FIGS. 1 and 2.
FIG. 4 is a diagrammatic vertical sectional view of a portion of a modified cotton feeder unit.

Referring more particularly to FIGS. 1 and 2 of the drawing, numeral 1 designates a pneumatic conveyor supplying cotton into a cotton feeder 2 from an opener, not shown. The cotton emerging from the apparatus 2 is conducted through a duct 3 provided with a rate of cotton flow measuring device 4 and a blower 5 by means of a transporting agent, for example air at superatmospheric pressure, into a circulating duct 6 which preferably has a rectangular cross section. The transition from the tubular outlet of the blower 5 to the duct 6 is effected by an adaptor 7. The width of the duct 6 corresponds approximately to the width of cards 9 which are placed in a row and which individually receive cotton from the duct 6 through vertical depositing shafts 8. The measuring device 4 interposed in the duct 3 forming the inlet end of the cotton circulating duct 6 is conventional and produces an electric signal corresponding to the weight of cotton passing per time unit through the device. A suitable device is disclosed in Patent No. 3,028,501. The cross section of the duct 6 supplying one row of carders 9 is preferably rectangular throughout its entire length. There is a second row of carders 9' which row is parallel to the first row, each of the carders 9' being provided with a depositing shaft 8' connected to and receiving cotton from a duct 6' connected in series relation to the duct 6. The outlet end of the duct 6' is connected to the apparatus 2 for returning unused cotton thereto.

The measuring apparatus 4 includes a device 10 producing control signals corresponding to the rate of flow of the cotton. The armature voltage of an electric motor 11 driving devices responsible for controlling the rate of cotton supply to the apparatus 2 is regulated by means of a magnetic amplifier 12 in dependence on the signal produced by the device 10 whereby the cotton supply to the apparatus 2 is increased upon a decrease of the return flow of unused cotton and vice versa.

The cotton feeding apparatus 2 is more clearly illustrated in FIG. 3. The cotton supplied by the conveyor 1 is conducted through a conventional suction box 13 provided with a sieve drum 13' into a vertical shaft 14. The cotton accumulated at the bottom of the shaft 14 is seized between rollers 15 and conducted in slightly compressed condition to a conventional feeding device consisting of a lever 16 having an arm having a concave surface and a feed roller 17 forming a nip with said surface. A beater 18 of conventional construction and placed adjacent to the cotton presenting device 15, 16, 17 loosens the fibrous material and produces fine flakes which are cleaned on a grid 19 before entering the suction duct 3 connected to the inlet of the blower 5 which blows the cotton flakes into the duct 6. As described before, the carders 9 and 9' receive the cotton from the ducts 6 and 6' through shafts 8 and 8' which are connected in parallel relation to the ducts 6 and 6' with respect to the flow of the cotton. In the arrangement shown in FIG. 3 the measuring device 4 is placed downstream of the blower 5 in contradistinction to the arrangement shown in FIGURES 1 and 2 wherein the measuring device 4 is upstream of the blower.

Unused cotton is returned from the duct 6' to a return shaft 20 forming part of the apparatus 2 and having a perforated side wall 21. In order to effect filling up of the shaft 20 from the bottom flaps 22 are pivotally connected to the wall 21 to swing on horizontal axes like the slats of a Venetian blind and tending to prevent flow of air from the inside of the shaft 20 through the perforations 21 to the outside. Weights at the lower ends of the flaps 22 tend to hold the flaps in closing position. Since the pressure of the air in the bottom of the shaft 20 adjacent to the accumulated cotton is relatively high, the lowermost flap above the level of the accumulated cotton will be opened by the air pressure permitting the air to flow from the shaft 20 into a shaft 23 adjacent to the wall 21. There is no cotton deposition adjacent to the upper flaps which remain in the closed position. A delivery roller pair 24 is arranged in the bottom of the shaft 20 which has only a slight gripping effect and releases the cotton before it is seized by the beater 18 which is adjacent to the delivery roller pair 24. The cotton emanating from the shaft 20 is, therefore, not beaten but is conducted over the cleaning grid 19 into the suction duct 3 and returned to the circuit for feeding the carders. The air escaping from the shaft 20 into the shaft 23 is returned through a dust filter 25 to the outlet 26 of the beater 18 and used as transporting agent for the cotton through the ducts 6 and 6'.

FIG. 4 illustrates a modified portion of the feeding device according to the invention whereby the delivery roller pair 24 at the bottom of the cotton return shaft 20 is omitted and the outlet of the discharge funnel of the shaft 20 is adjacent to the beater 18. There is no separation of returned cotton from the transporting agent and the transporting agent is not filtered before it is returned into the cotton distributing circuit.

We claim:

1. An automatic carding plant comprising a source of cotton supply, cotton feeding means connected to said source for receiving fresh cotton therefrom, a cotton circulating duct forming a loop having an inlet end connected to said feeding means for receiving cotton therefrom and having an outlet end connected to said feeding means for returning unused cotton thereto, a blower interposed in said duct for circulating a gaseous fluid therethrough for transporting the cotton, a plurality of shafts consecutively connected to said circulating duct for receiving cotton therefrom, a carding machine connected to each of said shafts for receiving cotton therefrom, said cotton feeding means including a fresh cotton supply shaft having an inlet at the upper end thereof connected to said source of supply for receiving fresh cotton therefrom, said fresh cotton supply shaft having an outlet at the lower end thereof, cotton presenting means placed adjacent to said outlet and forming a nip, cotton beating means operatively associated with said cotton presenting means for receiving fresh cotton from said nip, said beating means being placed adjacent to said inlet end of said circulating duct for discharging beaten cotton thereinto, and cotton delivery means interposed between said outlet end of said circulating duct and said inlet end of said circulating duct for causing unused returned cotton to move around said beating means into said inlet end and avoiding beating of the returned cotton.

2. An automatic carding plant as defined in claim 1 including a surplus cotton receiving shaft adjacent to said fresh cotton supply shaft and having an upper end connected to said outlet end of said circulating duct for receiving cotton therefrom and having a lower end connected to the inlet end of said circulating duct for returning unused cotton thereto.

3. An automatic carding plant according to claim 2 wherein said surplus cotton receiving shaft has a perforated wall affording escape of gaseous cotton transporting fluid, a conduit being connected to said inlet end of said circulating duct and placed adjacent to said cotton receiving shaft and having said perforated wall in common therewith for receiving the escaped cotton transporting fluid therefrom for returning the fluid to said inlet end of said circulating duct.

4. An automatic carding plant according to claim 3 including a dust filter placed in said conduit for filtering the gaseous cotton transporting fluid prior to reentry into said inlet end.

5. An automatic carding plant as defined in claim 1 including rate of cotton flow measuring means interposed in said inlet end of said circulating duct downstream of the connection of said outlet end to said inlet end, means for controlling the rate of flow of fresh cotton from said source through said cotton feeding means, and adjusting means operatively connected to said rate of cotton flow measuring means and to said rate of flow of fresh cotton control means for adjusting said control means in response to said measuring means for increasing the rate of flow of fresh cotton upon a decrease of the rate of cotton flow in the inlet end of said circulating duct and conversely.

References Cited in the file of this patent
UNITED STATES PATENTS 1,365,663     Covert _____ Jan. 18, 1921